(12) United States Patent
Bousfield

(10) Patent No.: US 11,691,714 B2
(45) Date of Patent: *Jul. 4, 2023

(54) FOLDING BEAM FOR SWINGING WING

(71) Applicant: TUDOR CROSSFELT, LP, Las Vegas, NV (US)

(72) Inventor: Samuel Hall Bousfield, Meadow Vista, CA (US)

(73) Assignee: TUDOR CROSSFELT, LLP, Las Vegas, NV (US)

( * ) Notice: Subject to any disclaimer, the term of this patent is extended or adjusted under 35 U.S.C. 154(b) by 249 days.

This patent is subject to a terminal disclaimer.

(21) Appl. No.: 17/234,251

(22) Filed: Apr. 19, 2021

(65) Prior Publication Data

US 2021/0237849 A1 Aug. 5, 2021

Related U.S. Application Data

(63) Continuation of application No. 16/074,248, filed as application No. PCT/US2017/015766 on Jan. 31, 2017, now Pat. No. 11,001,366.

(60) Provisional application No. 62/388,598, filed on Feb. 1, 2016.

(51) Int. Cl.
| | |
|---|---|
| *B64C 3/56* | (2006.01) |
| *B60F 5/02* | (2006.01) |
| *B64C 1/26* | (2006.01) |
| *B64C 37/00* | (2006.01) |

(52) U.S. Cl.
CPC ............... *B64C 3/56* (2013.01); *B60F 5/02* (2013.01); *B64C 1/26* (2013.01); *B64C 37/00* (2013.01)

(58) Field of Classification Search
CPC .............. B64C 3/56; B64C 37/00; B60F 5/02

USPC ........................................................ 244/49
See application file for complete search history.

(56) References Cited

U.S. PATENT DOCUMENTS

| | | | |
|---|---|---|---|
| 794,652 | A | 7/1905 | Young et al. |
| 1,316,280 | A | 9/1919 | Curtiss |
| 1,353,179 | A | 9/1920 | MacIndoe |
| 1,749,769 | A | 3/1930 | Johnson |
| 2,572,421 | A | 10/1951 | Abel, Jr. |
| 2,712,421 | A | 7/1955 | Naumann |
| 2,893,661 | A | 7/1959 | Aylor |
| 3,012,737 | A | 12/1961 | Dodd |
| 4,269,374 | A | 5/1981 | Miller |
| 5,192,037 | A | 3/1993 | Moorefield |

(Continued)

FOREIGN PATENT DOCUMENTS

| | | |
|---|---|---|
| DE | 102009060611 A1 | 6/2011 |
| EP | 3412560 B1 | 12/2018 |

(Continued)

OTHER PUBLICATIONS

ISR and WO for PCT/US17/15766 dated May 8, 2017, 8 pp.

(Continued)

*Primary Examiner* — Christopher P Ellis
(74) *Attorney, Agent, or Firm* — Hauptman Ham, LLP

(57) ABSTRACT

Some embodiments described herein relate to a wing that is coupled to a body of a vehicle and configured to rotate forward from a deployed configuration, in which the wing extends from the body to a retracted configuration in which a tip portion of the wing is closer to a nose portion of the body than a root portion of the wing is to the nose portion. A hinged beam having a first portion pivotably coupled to a second portion is configured to transmit loads associated with flight from the wing to the body.

20 Claims, 17 Drawing Sheets

(56) References Cited

U.S. PATENT DOCUMENTS

| | | |
|---|---|---|
| 5,240,203 A | 8/1993 | Myers |
| 6,082,665 A | 7/2000 | Spitzer |
| 6,129,306 A | 10/2000 | Pham |
| 6,224,012 B1 | 5/2001 | Wooley |
| 7,946,527 B2 | 5/2011 | Holmes |
| 8,210,473 B2 | 7/2012 | Schweighart et al. |
| 9,545,991 B1 | 1/2017 | Alley et al. |
| 9,776,715 B2 | 10/2017 | Zhou et al. |
| 10,252,798 B2 | 4/2019 | Petrov |
| 10,322,794 B1 | 6/2019 | Copp et al. |
| 10,435,138 B2 | 10/2019 | Gionta et al. |
| 2009/0302151 A1 | 12/2009 | Holmes |
| 2010/0230532 A1 | 9/2010 | Dietrich et al. |
| 2013/0056579 A1 | 3/2013 | Schlipf et al. |
| 2013/0146716 A1 | 6/2013 | Gettinger |
| 2016/0090170 A1 | 3/2016 | Thompson |
| 2016/0264232 A1 | 9/2016 | Briancourt et al. |
| 2017/0183093 A1 | 6/2017 | Bialek |
| 2019/0248492 A1 | 8/2019 | Roldan De Perera |
| 2019/0322351 A1 | 10/2019 | Lorenz |
| 2020/0231269 A1 | 7/2020 | Woubou |

FOREIGN PATENT DOCUMENTS

| | | |
|---|---|---|
| EP | 3560832 B1 | 10/2019 |
| EP | 3699081 A1 | 8/2020 |
| GB | 490151 A | 8/1938 |
| GB | 554680 A | 7/1943 |
| WO | 2015179122 A2 | 11/2015 |
| WO | 2015179122 A3 | 11/2015 |
| WO | 2019141361 A1 | 7/2019 |

OTHER PUBLICATIONS

Image, Samson Sky, Oshkosh, Wisconsin, 2009.

Image, Samson Sky, Jul. 2009.

Extended European Search Report for EP 17 74 7998 dated Jul. 26, 2019, 8 pp.

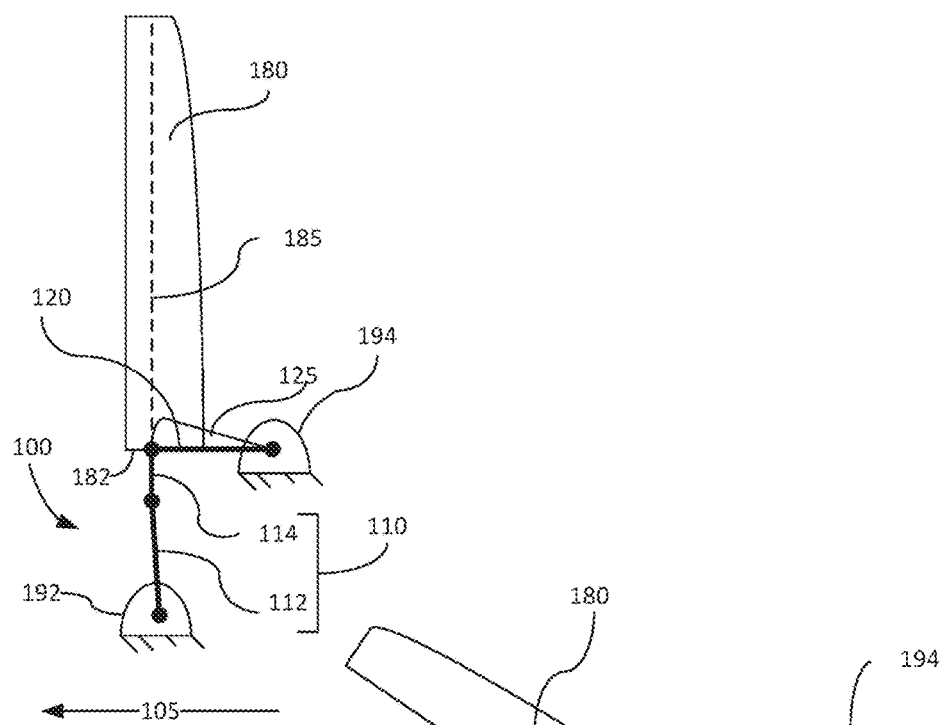
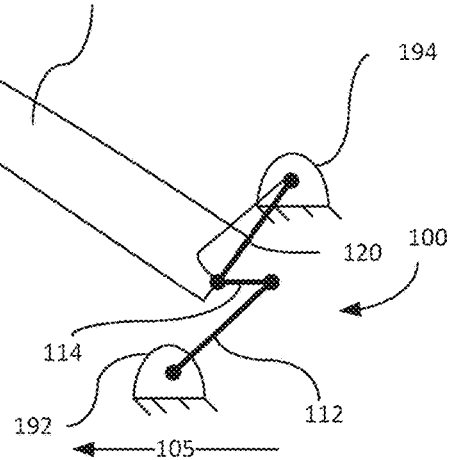
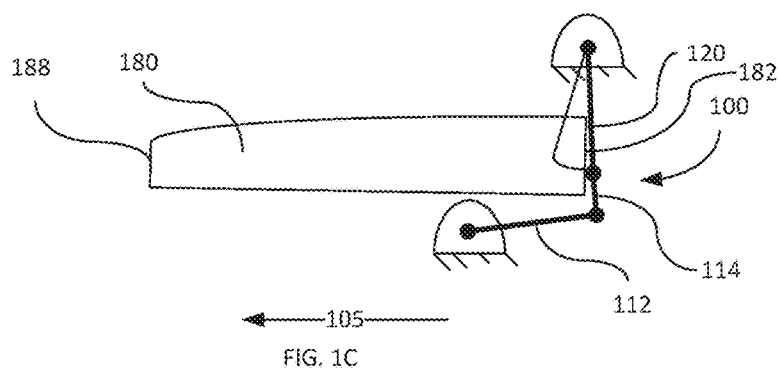

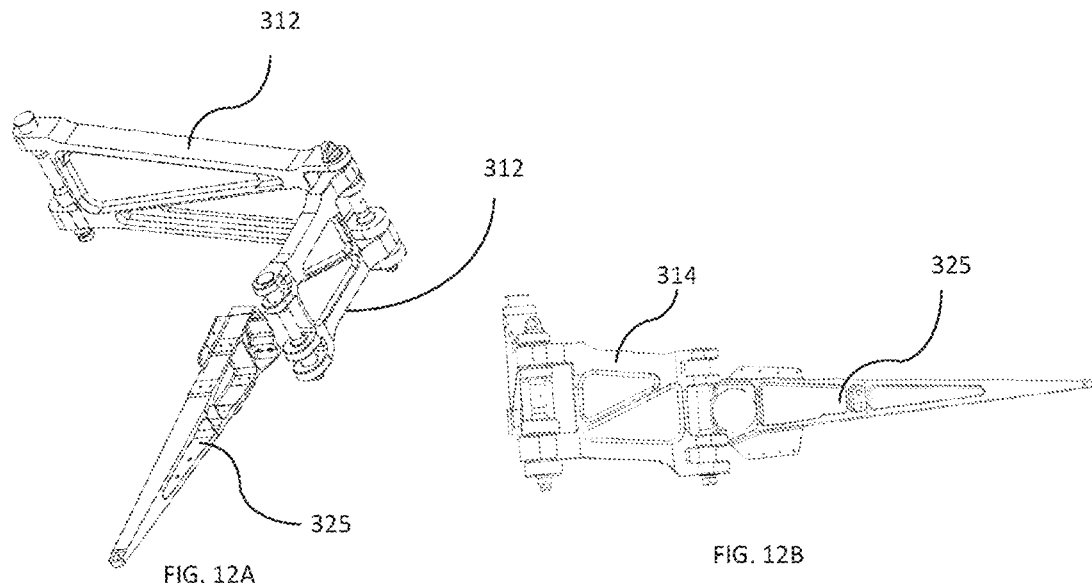
FIG. 12A
FIG. 12B
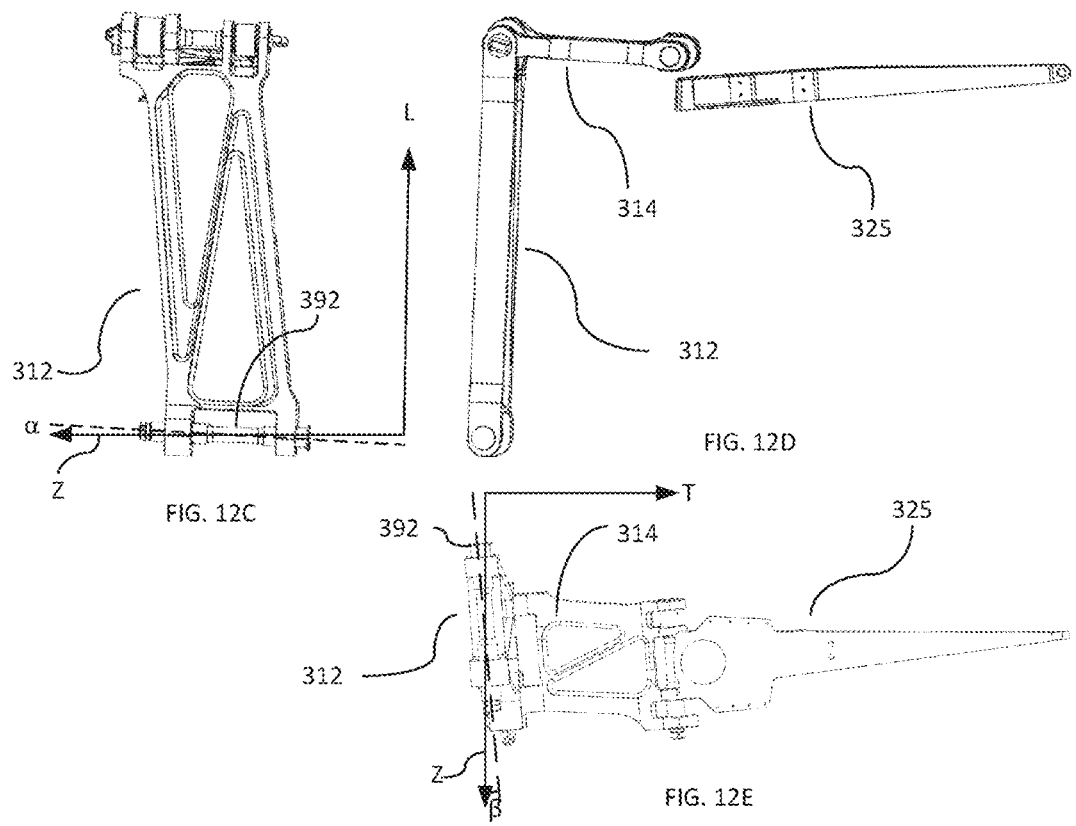
FIG. 12C
FIG. 12D
FIG. 12E

FOLDING BEAM FOR SWINGING WING

CROSS REFERENCE TO RELATED APPLICATIONS

This application is a continuation of U.S. application Ser. No. 16/074,248 filed Jul. 31, 2018, which is a U.S. National Stage of International Application Number PCT/US2017/015766 filed Jan. 31, 2017 which claims priority of U.S. Provisional Application No. 62/388,598 filed Feb. 1, 2016.

BACKGROUND

The present application generally relates to swinging wings, particularly horizontally swinging wings to reduce the front profile of the vehicle for ground use. Embodiments of the present application are particularly (but not exclusively) well suited to a "flying car" or "roadable aircraft."

A number of aircraft have been developed with folding wings such as the FA-18 Hornet and A6 Intruder, each of which include wings that can be folded vertically to reduce storage space when landed, particularly for aircraft carrier operations. Similarly, the wings of the Icon AS fold vertically to reduce width for on-road towing. Because such folding wings remain exposed to airflow, they are generally unsuitable for a flying car or roadable aircraft. The present application generally relates to swinging wings, that is, wings whose movement is primarily in the horizontal direction, rather than folding wings.

A significant challenge of designing aircraft with variable wing configurations is the transmission of forces and moments from the wings to the body of the aircraft. In folding wing aircraft, a fairly simple design of a hinged wing spar is typical. In such an aircraft, the root of the wing spar remains fixedly coupled to the vehicle frame by conventional means. In a swinging wing design, the root of the wing spar moves relative to the vehicle frame, posing more significant challenges in transmitting forces to the vehicle frame.

The F111 and F15 aircraft are both swing wing aircraft that use a titanium hub to transmit forces from the wings to the aircraft body. Such a hub is large, heavy, expensive, and prone to maintenance failures. Such a hub may be acceptable for extremely high-power, high-performance, and high-cost warplanes, but is generally unsuitable for a flying car or roadable aircraft for civilian use. Moreover, the swing-wing design of the F111 and F15 is not capable of rotating the wings through more than approximately 60 degrees. The present application relates to a light-weight and convenient swing wing design capable of rotating the wings through approximately 90 degrees.

BRIEF DESCRIPTION OF THE DRAWINGS

FIGS. 1A-1C are schematic diagrams of a mechanism for swinging an aircraft wing from a deployed configuration, through an intermediate configuration, and into a retracted configuration, respectively, according to an embodiment.

FIGS. 12A-E are a top-left-perspective, front-planar, left-planar, top-planar, and rear-planar views of the mechanism of FIG. 11.

DETAILED DESCRIPTION

Figure 2:
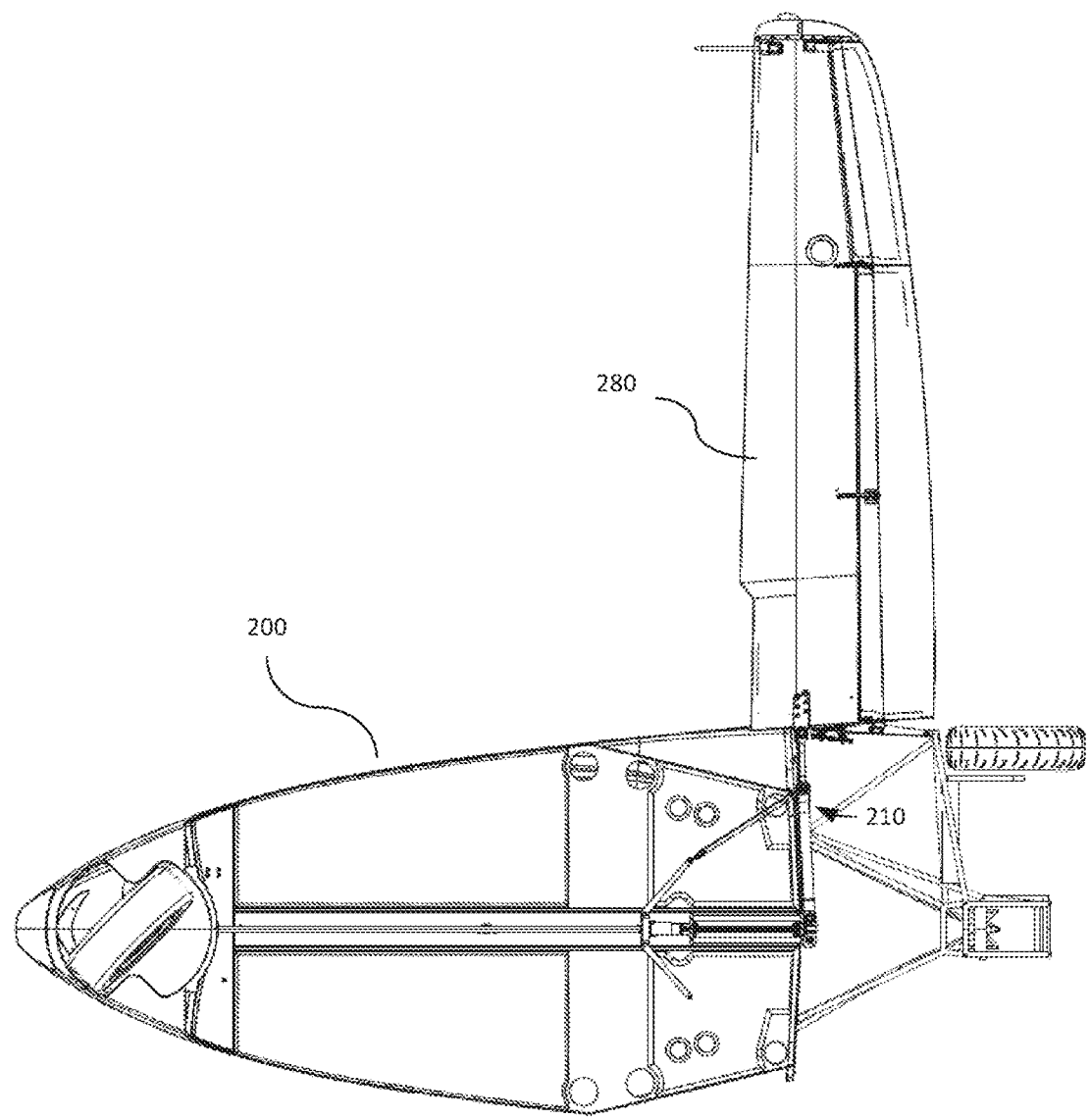
FIG. 2 is a bottom view of a vehicle having a swing wing in a deployed configuration, according to an embodiment.

Some embodiments described herein relate to a wing that is coupled to a body of a vehicle and configured to rotate forward from a deployed configuration, in which the wing extends from the body to a retracted configuration in which a tip portion of the wing is closer to a nose portion of the body than a root portion of the wing is to the nose portion. A hinged beam having a first portion pivotably coupled to a second portion is configured to transmit loads associated with flight from the wing to the body.

Some embodiments described herein relate to a wing that is coupled to a body of a vehicle and configured to rotate forward from a deployed configuration to a retracted configuration. A linkage couples the wing to the body. The linkage includes a hinge arm and a hinged beam. The hinged beam includes a first portion pivotably coupled to a second portion. The first portion of the beam is rotatably coupled to a frame of the vehicle. The second portion of the beam is rotatably coupled to the wing. The hinge arm is fixedly coupled to the wing and rotatably coupled to the frame of the vehicle.

Some embodiments described herein relate to a wing that is coupled to a body of a vehicle and configured to rotate forward from a deployed configuration to a retracted configuration. A hinged beam having a first portion pivotably coupled to a second portion couples the wing to a frame of the vehicle. The first portion of the beam is configured to rated in the forward direction through at least 70 degrees when the wing moves from the retracted configuration to the deployed configuration. A hinge arm coupling the wing to the frame of the vehicle is also configured to rotate through at least 70 degrees in the same rotational direction as the first portion of the beam when the wing moves from the retracted configuration to the deployed configuration.

FIG. 1A is a schematic diagram of an aircraft wing 180 in a deployed configuration and a mechanism 100 for swinging the wing 180, according to an embodiment. An arrow 105 indicates the forward direction of the wing 180 and vehicle.

The mechanism 100 is pivotably fixed to a frame (e.g., a structural member) of the vehicle at a forward point 192 and an aft point 194. The forward point 192 and the aft point 194 can each be fixed relative to a frame of the vehicle. In some embodiments the forward point 192 can be on or substantially on the centerline of the vehicle body. As used herein, the term "substantially" encompasses deviations of up to 10% from the nominal. For example, an embodiment in which the forward point 192 is 10% off-center, that is, where a distance between a centerline of the vehicle body and the forward point 192 is 10% or less than the width of the vehicle body at the relevant longitudinal position, the forward point can be said to be substantially on the centerline of the vehicle body.

A beam 110 is rotatably coupled to the forward point 192. The beam 110 (or a portion thereof) can be the primary load bearing structure that transmits forces and/or moments from the wing 180 to the frame of the vehicle. Similarly stated, the beam 110 can be operable to transmit substantially all loads and/or moments associated with weight/lift and/or thrust/drag from the wing 180 to the frame of the vehicle. For example, the beam 110 can be an extension of a main wing spar 185. In some embodiments, the beam 110 can be I-shaped or otherwise thicker at the top and/or bottom portion than at a central portion.

The beam 110 is constructed of two portions, a first portion 112 and a second portion 114, pivotably coupled together. Similarly stated, the beam 110 is hinged. The second portion 114 of the beam 110 is pivotably coupled to a root 182 of the wing 180. In some embodiments, the second portion 114 of the beam 110 is coupled to the wing 180 at a point along the chord of the wing 180 substantially corresponding to the location of the main wing spar 185.

The wing 180 is coupled to the aft point 194 via a hinge arm 125. In some embodiments, the hinge arm 125 can be a triangular beam. The hinge arm 125 can be pivotably coupled to the aft point 194 and fixedly coupled to the wing 180.

Line 120 represents a kinematic link between the aft point 194 and the second portion 114 of the beam 110. In another embodiment, 120 can represent a physical link between the aft point 194 and the second portion 114 of the beam 110, and the wing 180 can be fixedly coupled to link 120. Alternatively, the second portion 114 of the beam 110 can be fixedly coupled to the wing 180 and hinge arm 125 can be rotatably coupled to the aft point 194 and wing 180 or the second portion 114 of the beam 110.

FIG. 1A depicts the wing 180 in the deployed configuration. In this configuration, the first portion 112 and the second portion 114 of the beam 110 are substantially coaxial (e.g., the angle formed between the first portion of the beam 112 and the second portion 114 of the beam 110 is 180 degrees +/−10%). The second portion 114 of the beam 110 and line 120 are substantially normal (e.g., the angle formed between the second portion 112 of the beam 110 and the line 120 is 90 degrees +/−10%). Thus, in the transverse axis, the distance between the forward point 192 and the aft point 194 is substantially equal to the length of the beam 110 (i.e., the combined length of the first portion 112 and the second portion 114 of the beam 110). In the longitudinal axis, the distance between the forward point 192 and the aft point 194 is substantially equal to the length of line 120.

FIG. 1B depicts the mechanism 100 and the wing 180 in an intermediate configuration between the deployed configuration and a retracted configuration. As shown in FIG. 1B, the first portion 112 of the beam 110 and line 120 each rotate in the aft direction as the wing 180 swings forward from the deployed configuration shown in FIG. 1A to the retracted configuration, shown in FIG. 1C. The second portion 114 of the beam 110 pivots relative to the first portion 112 of the beam 110 and line 120.

FIG. 1C depicts the mechanism 100 and the wing 180 in the retracted configuration. In the retracted configuration, the tip 188 of the wing 180 is forward of the root 182 of the wing 180. As the wing 180 moves from the deployed configuration to the retracted configuration, the first portion 112 of the beam 110 and line 120 each rotate in the aft direction through at least 70 degrees. In some embodiments the first portion 112 of the beam 110 and/or line 120 rotate in the aft direction through approximately 90 degrees (e.g., through 80-100 degrees). In some embodiments, when the wing 180 is in the retracted configuration, the second portion 114 of the beam 110 and line 120 are substantially coaxial.

As described in further detail herein, the first portion 112 and the second portion 114 of the beam 110 can be substantially flush to the wing 180 when the wing 180 is in the retracted configuration. For example, the second portion 114 of the beam 110 can be substantially parallel to the root 182 of the wing 180, while the first portion 112 of the beam 110 can be substantially parallel to a leading edge of the wing. In addition or alternatively, and as described in further detail herein, the leading edge of the wing 180 can be notched near the root 182. In such an embodiment, at least some part of the first portion 112 of the beam 110 can positioned within the notch when the wing 180 is in the retracted configuration. Such configurations can minimize the space occupied by the mechanism 100 and the wing 180 when the wing is in the retracted configuration, which can in turn minimize the vehicle width when the vehicle is configured for road operations and/or maximize the wing 180 surface area for a given vehicle width when the vehicle is configured for aerial operations.

FIG. 1A-1C depicts a single (e.g., horizontal) plane of mechanism 100. It should be understood, however, that any of the forward point 192, the aft point 194, the joint connecting the first portion of the beam 112 to the second portion of the beam 114, and the joint connecting the second portion of the beam can be canted, angled, or otherwise offset such that the mechanism 100 includes movement in another (e.g., vertical) plane.

Figure 3:
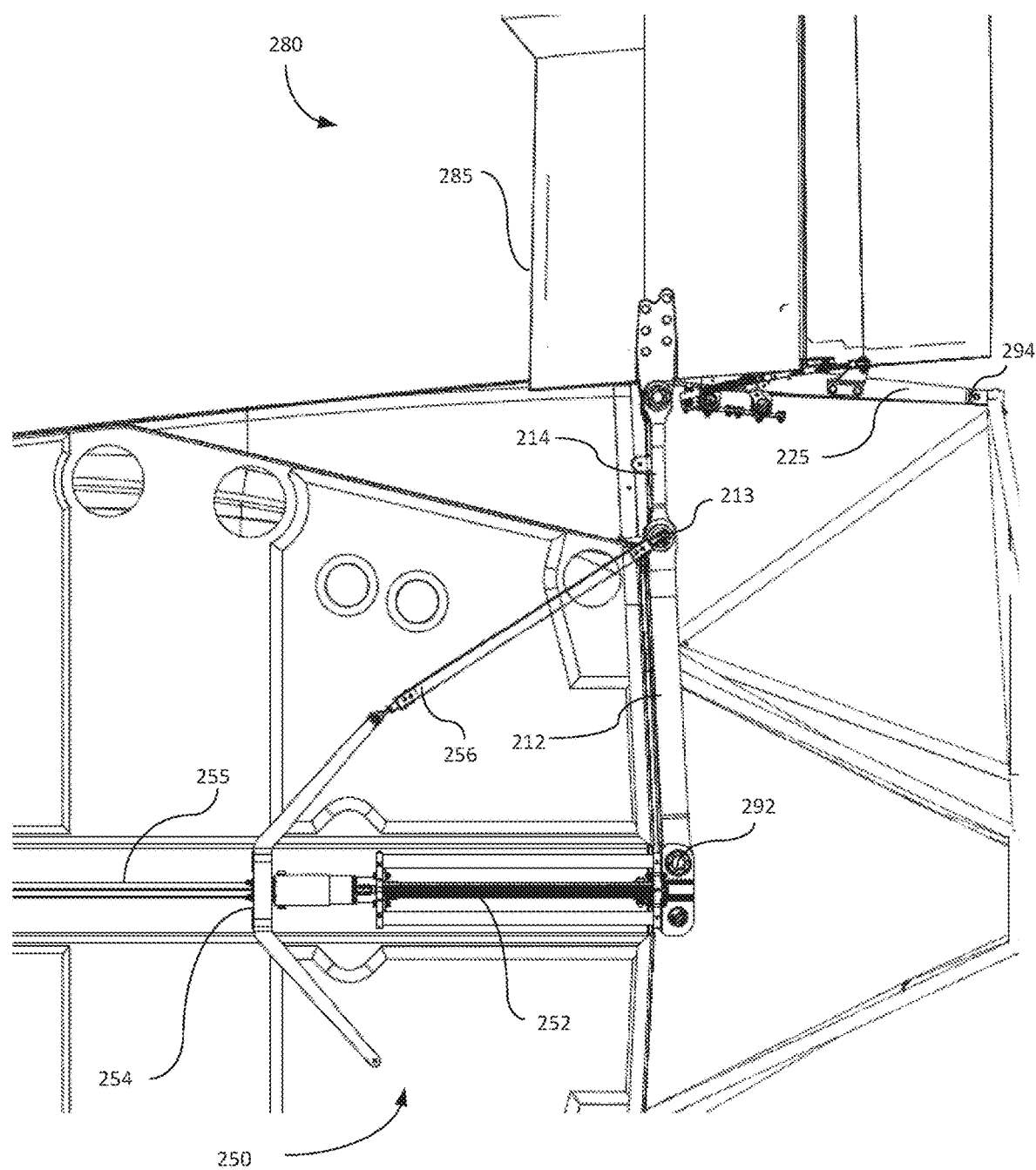
FIG. 3 is a detail view of FIG. 2 showing a mechanism for swinging a wing in a deployed configuration.
Figure 4:
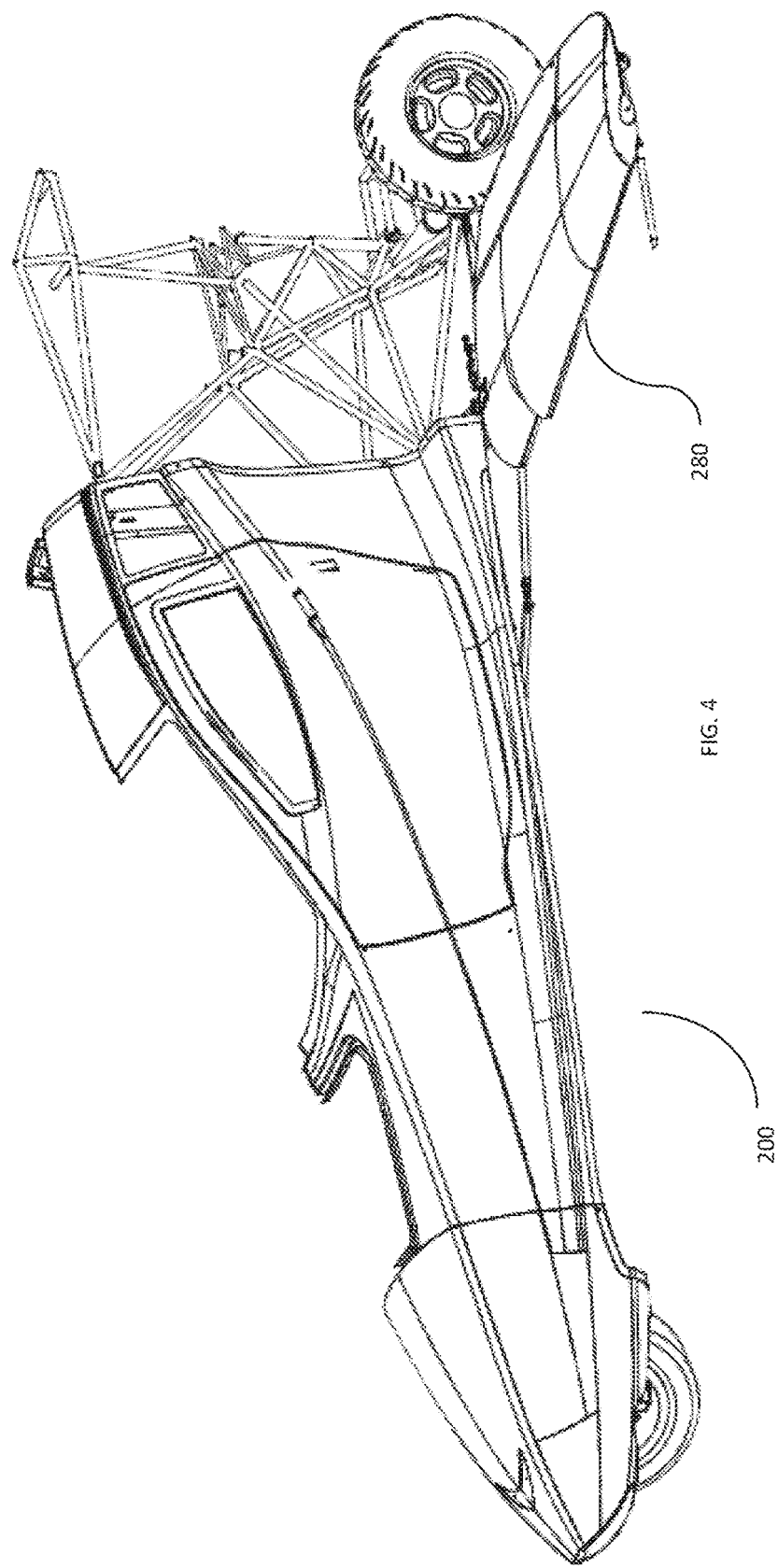
FIG. 4 is a perspective view of the vehicle of FIG. 2 showing the wing in the deployed configuration.

FIG. 2 is a bottom view of a vehicle body 200 having a wing 280 in a deployed configuration, according to an embodiment. FIG. 2 also shows a mechanism for swinging the wing between the deployed configuration and a retracted configuration. FIG. 3 is a detail view of FIG. 2 providing an enlarged view of the mechanism. FIG. 4 is a perspective view of the vehicle of FIG. 2 showing the wing in the deployed configuration. For ease of illustration and explanation, the figures show, and the written description refers to, a single wing. It should be understood that a vehicle can include a substantially symmetrical second wing. Similarly, only a portion of the vehicle body 200 is shown.

In FIG. 3, the wing 280 is pivotally connected to a structural element, such as a frame, of the vehicle body 200 at an aft connection point 294 via a hinge arm 225. The hinge arm 225 is fixedly coupled to the wing 280. The wing 280 is also coupled to the frame of the vehicle body 200 at a forward point 292 via a beam 210. The beam 210 is hinged at pivot point 213 and includes a first portion 212 inboard of the pivot point 213 and a second portion 214 outboard of the pivot point 213.

FIGS. 2 and 3 are each horizontal cross sections of the vehicle body. As shown, in the horizontal plane, the beam 210 is substantially straight and substantially parallel to the leading edge of the wing 280. Similarly stated, the first portion 212 and the second portion 214 of the beam 210 are substantially coaxial in the horizontal direction, forming an angle substantially equal to 180 degrees. In other embodiments, the first portion 212 and the second portion 214 of the beam 210 can form an angle between 160 and 200 degrees when the wing is in the deployed configuration.

FIGS. 2 and 3 further depict an actuation assembly 250 configured to move the wing between deployed and retracted configurations. The actuation assembly 250 includes a linear actuator 252 (e.g., a powered jack screw) disposed on or substantially on the centerline of the vehicle body 200. A shuttle 254 coupled to the linear actuator 252 is operable to slide longitudinally on one or more guide rails 255 disposed on or substantially on the centerline of the vehicle body 200. A drive link 256 couples the linear actuator 252 to pivot point 213 via the shuttle 254. The shuttle 254 and the drive link 256 are pivotably coupled and collectively configured such that, when the wing is in the deployed configuration, the first portion of the beam 212 and the drive link 256 form an angle of approximately 45 degrees (e.g., 35-55 degrees).

Figure 5:
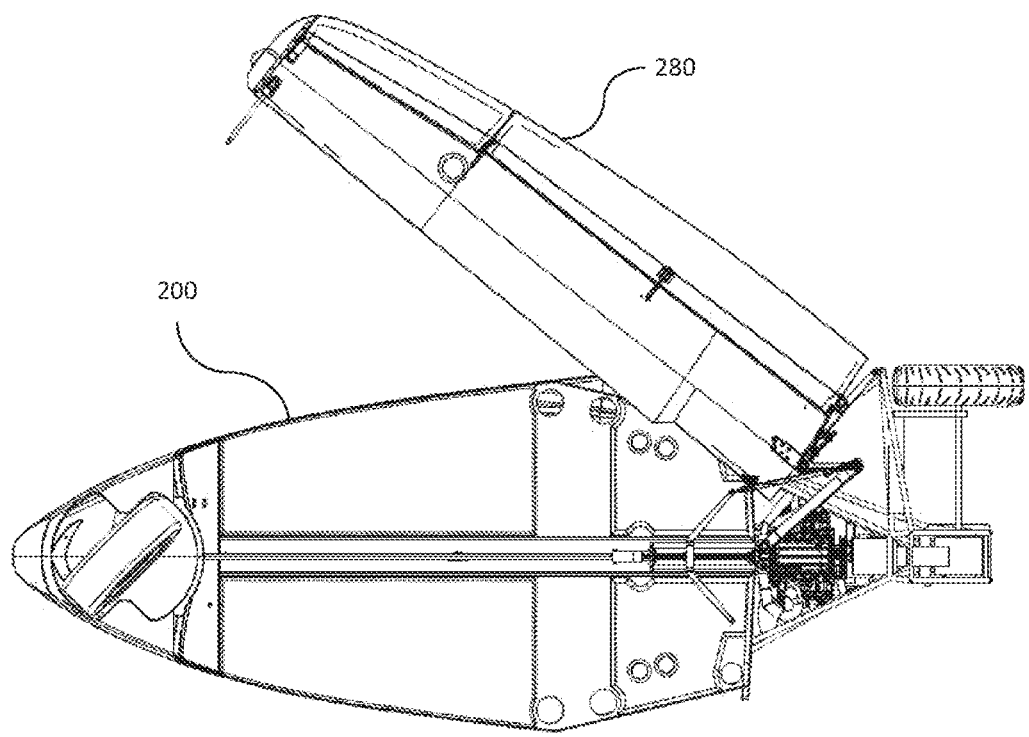
FIG. 5 is a bottom view of the vehicle of FIG. 2 having the wing in an intermediate configuration.
Figure 6:
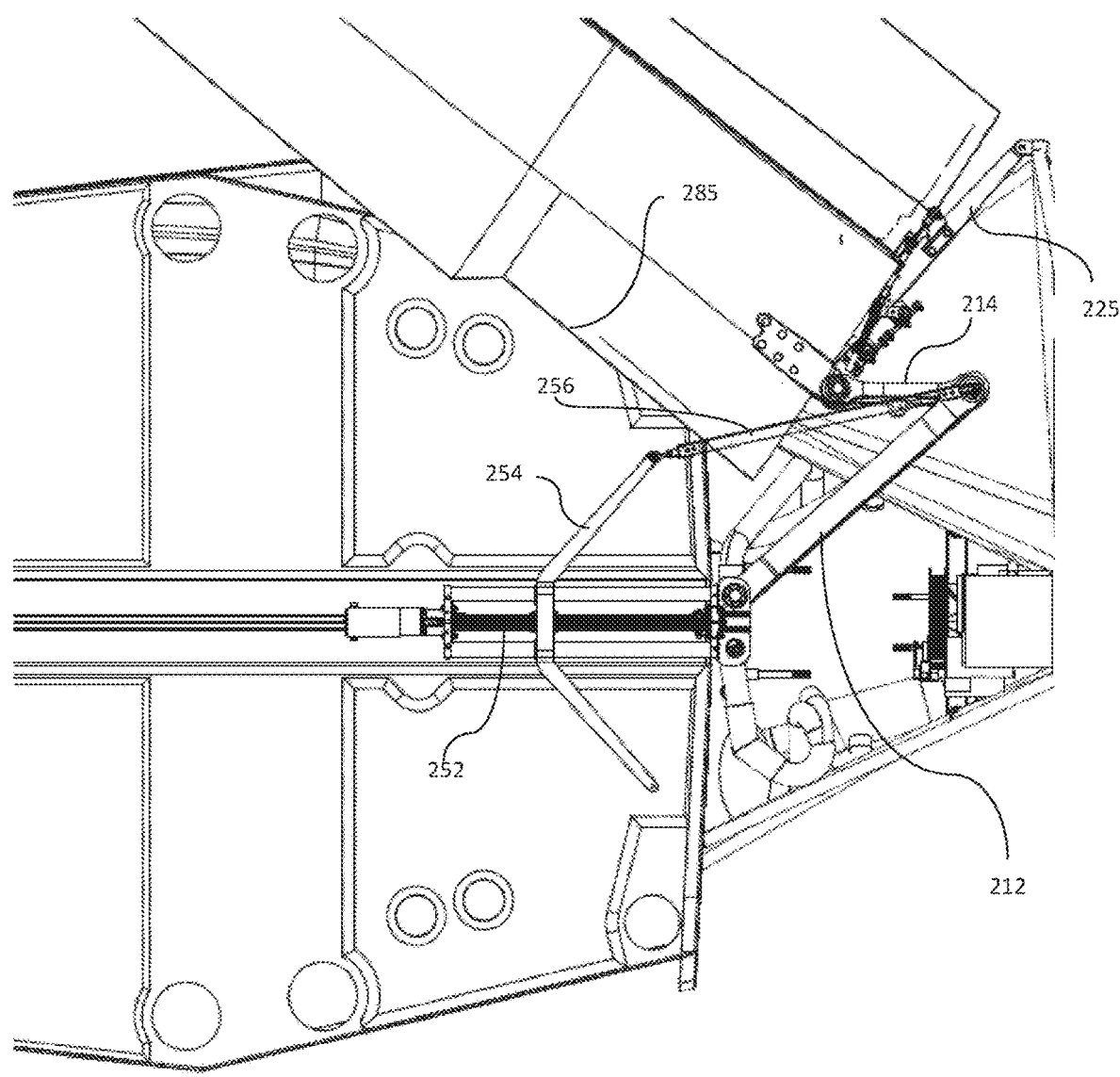
FIG. 6 is a detail view of FIG. 5 showing the mechanism for swinging the wing in an intermediate configuration.
Figure 7:
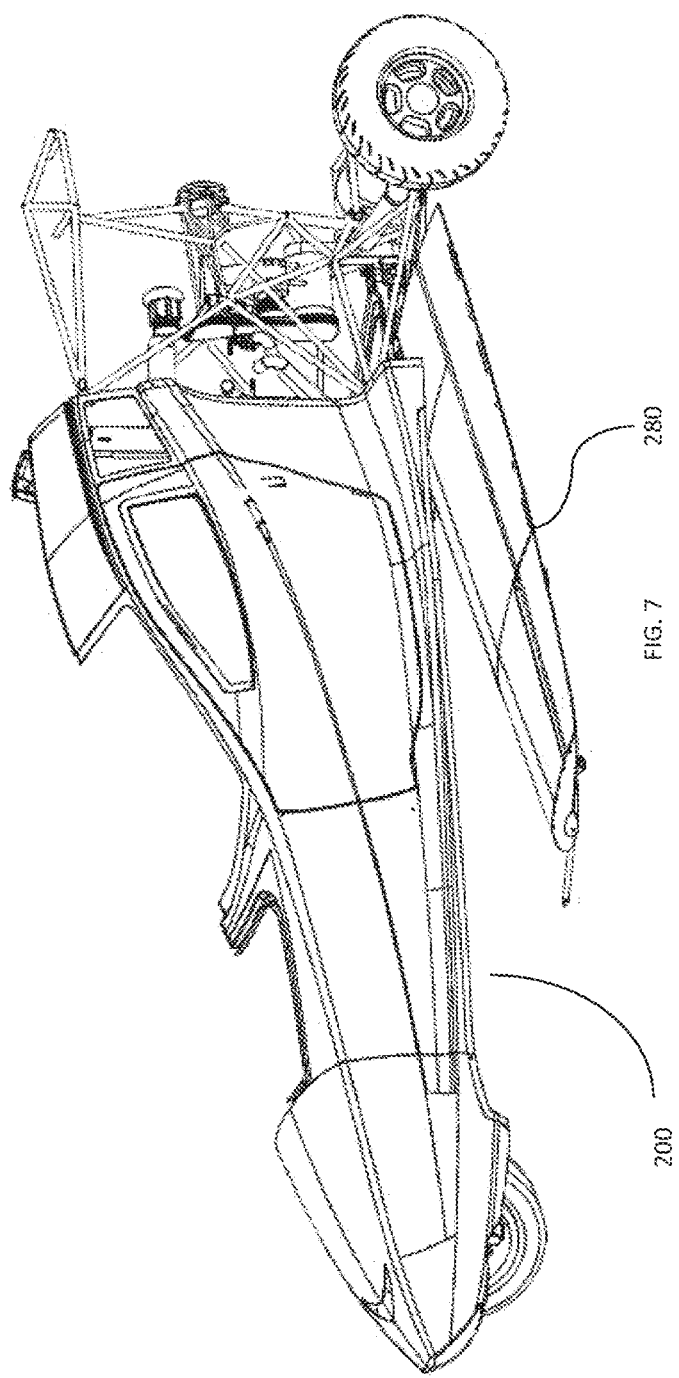
FIG. 7 is a perspective view of the vehicle of FIG. 2 showing the wing in the intermediate configuration.

FIG. 5 is a bottom view of the vehicle body 200 with the wing 280 in an intermediate configuration, according to an embodiment. FIG. 6 is a detail view of FIG. 5 providing an enlarged view of the mechanism. FIG. 7 is a perspective view showing the wing 280 in the intermediate configuration.

Comparing FIG. 6 to FIG. 3, the linear actuator 252 has caused the shuttle 254 to move aftward, rotating the first portion 212 of the hinge beam 210 and the hinge arm 225 aftward. As the hinge arm 225 moves aftward the wing 280, to which the hinge arm 225 is fixedly coupled, rotates forward from the deployed configuration depicted in FIGS. 2-4 towards the retracted configuration shown in FIGS. 8-10.

Figure 8:
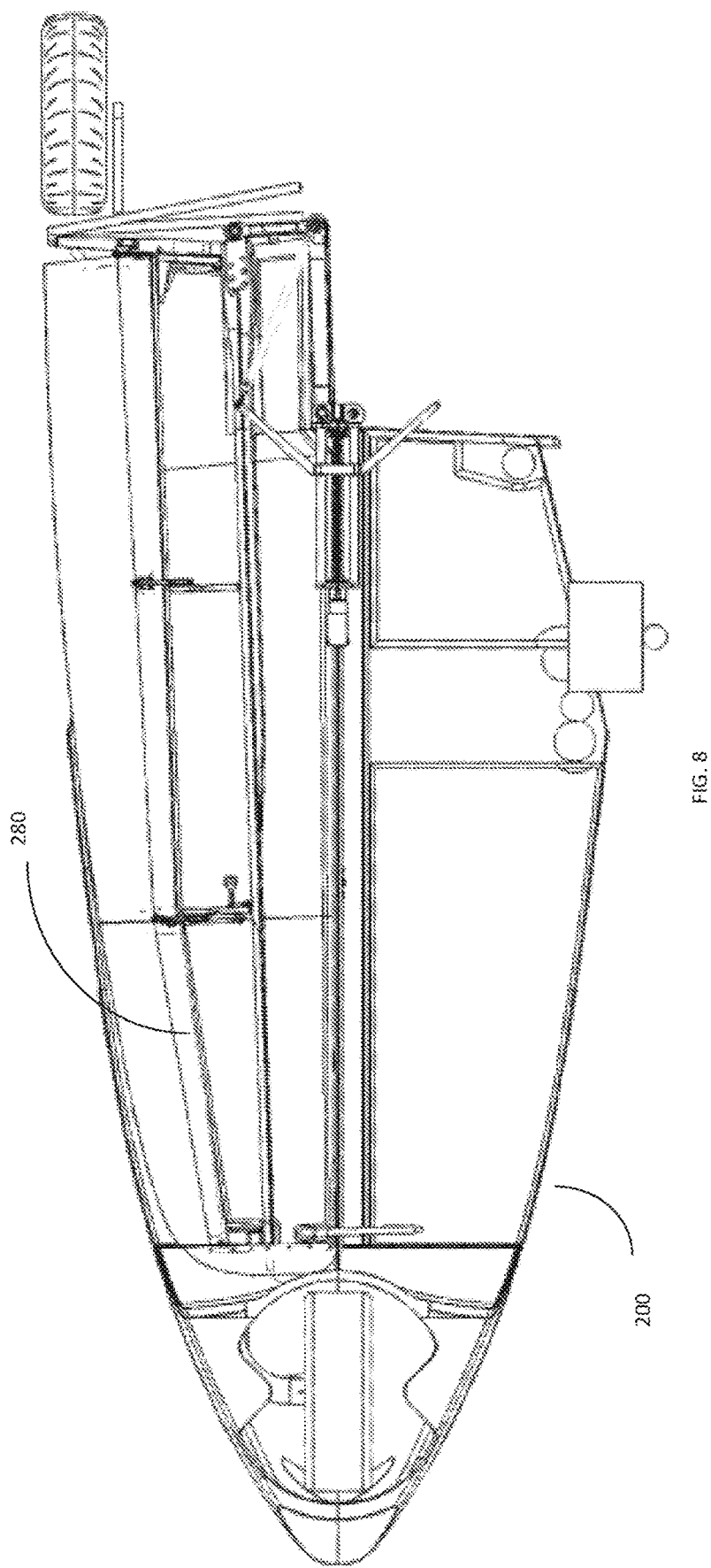
FIG. 8 is a bottom view of the vehicle of FIG. 2 having the swing wing in a retracted configuration.
Figure 9:
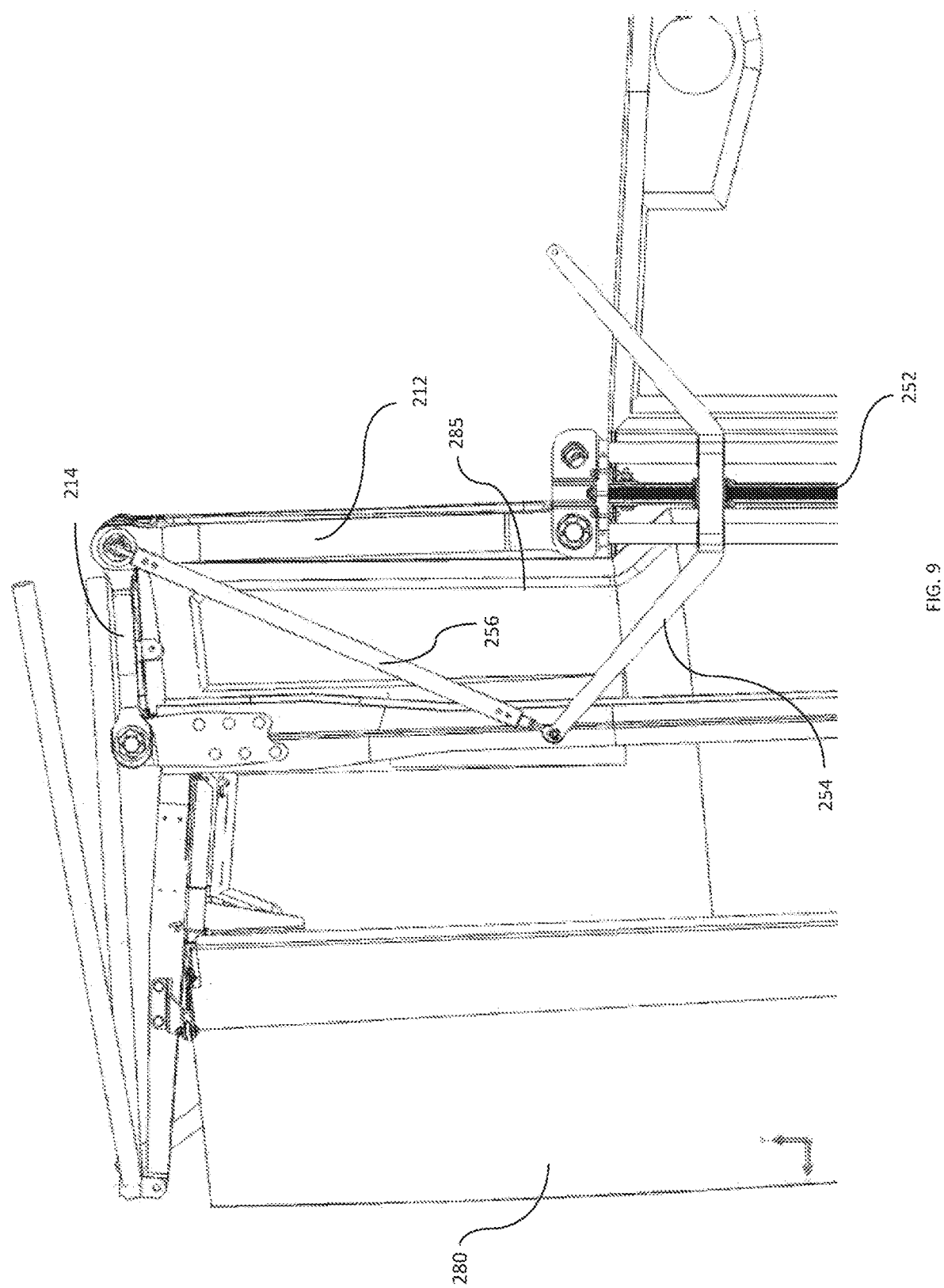
FIG. 9 is a detail view of FIG. 8 showing the mechanism for swinging the wing in a retracted configuration.
Figure 10:
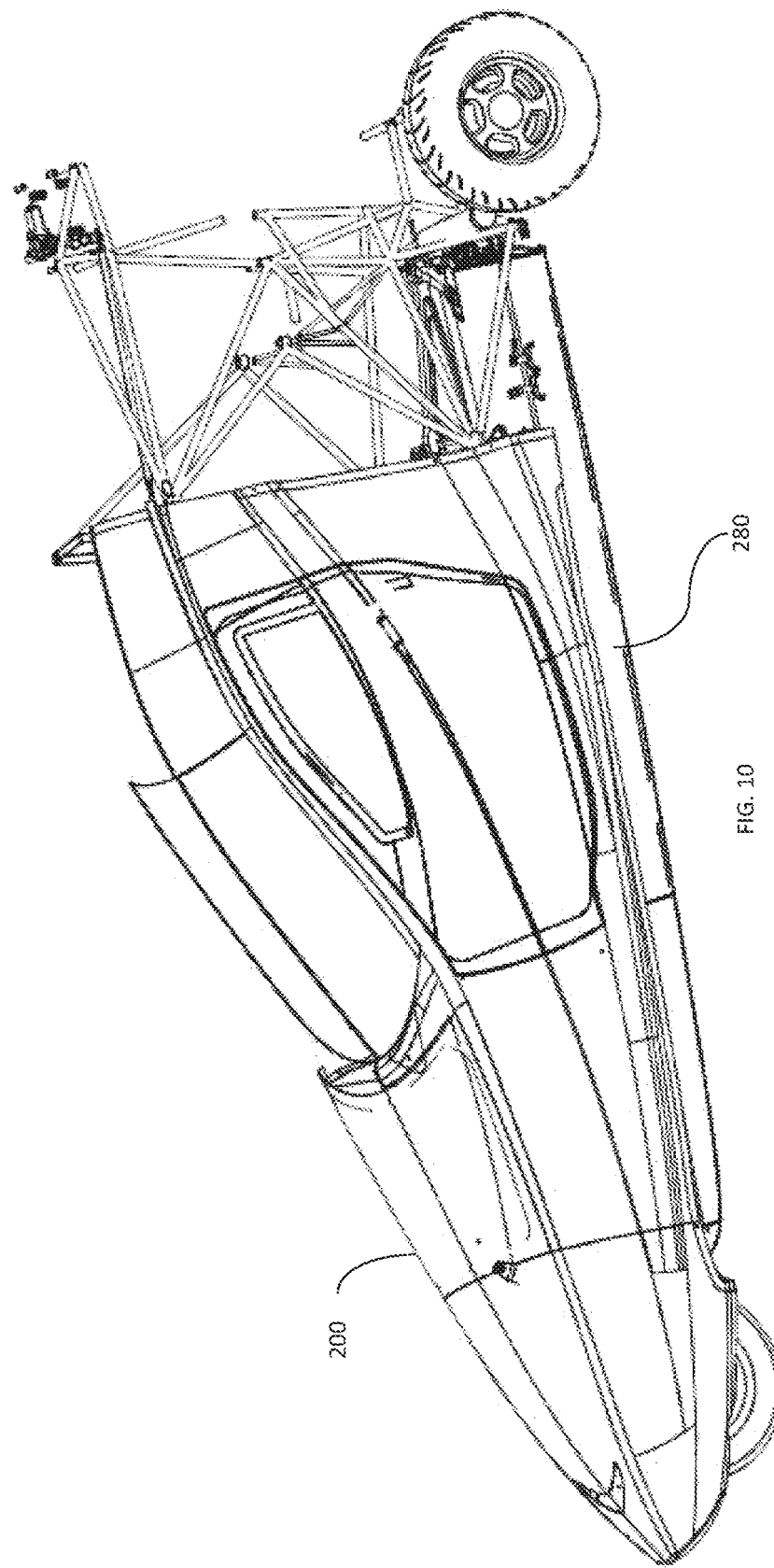
FIG. 10 is a perspective view of the vehicle of FIG. 2 showing the wing in the retracted configuration.

FIG. 8 is a bottom view of the vehicle body 200 with the wing 280 in a retracted configuration, according to an embodiment. FIG. 9 is a detail view of FIG. 8 providing an enlarged view of the mechanism. FIG. 10 is a perspective view showing the wing 280 in the retracted configuration. As shown in FIGS. 8 and 10, all or substantially all of the wing is disposed below and within the envelope of the vehicle body 200, when the wing is in the retracted configuration.

Again, by comparing FIG. 9 to FIGS. 3 and 6, it can be seen that the linear actuator 252 has caused the shuttle 254 to be moved further aftward. The first portion 212 of the hinge beam 210 is nested within a notch 285 defined by a leading edge of the wing 280. The first portion 212 of the hinge beam 210 is approximately parallel to (e.g., forms an angle of between 340 and 20 degrees with respect to) the centerline of the vehicle body 200 and the leading edge of the wing 280. The notch 285 decreases the overall width between the centerline of the vehicle and the trailing edge of the wing when the wing is in the retracted configuration. In this way, the width of the vehicle body 200 can be substantially equal to twice the chord length of the wing. Similarly stated, the notch 285 can provide room such that the width of the first portion 212 of the hinge beam 210 does not contribute significantly to a width of the vehicle. Described slightly differently, in the absence of the notch 285, the chord length along the majority of the span of the wing 280 (e.g., the portion not notched in the present embodiment) would be narrower for a given vehicle width.

Figure 11:
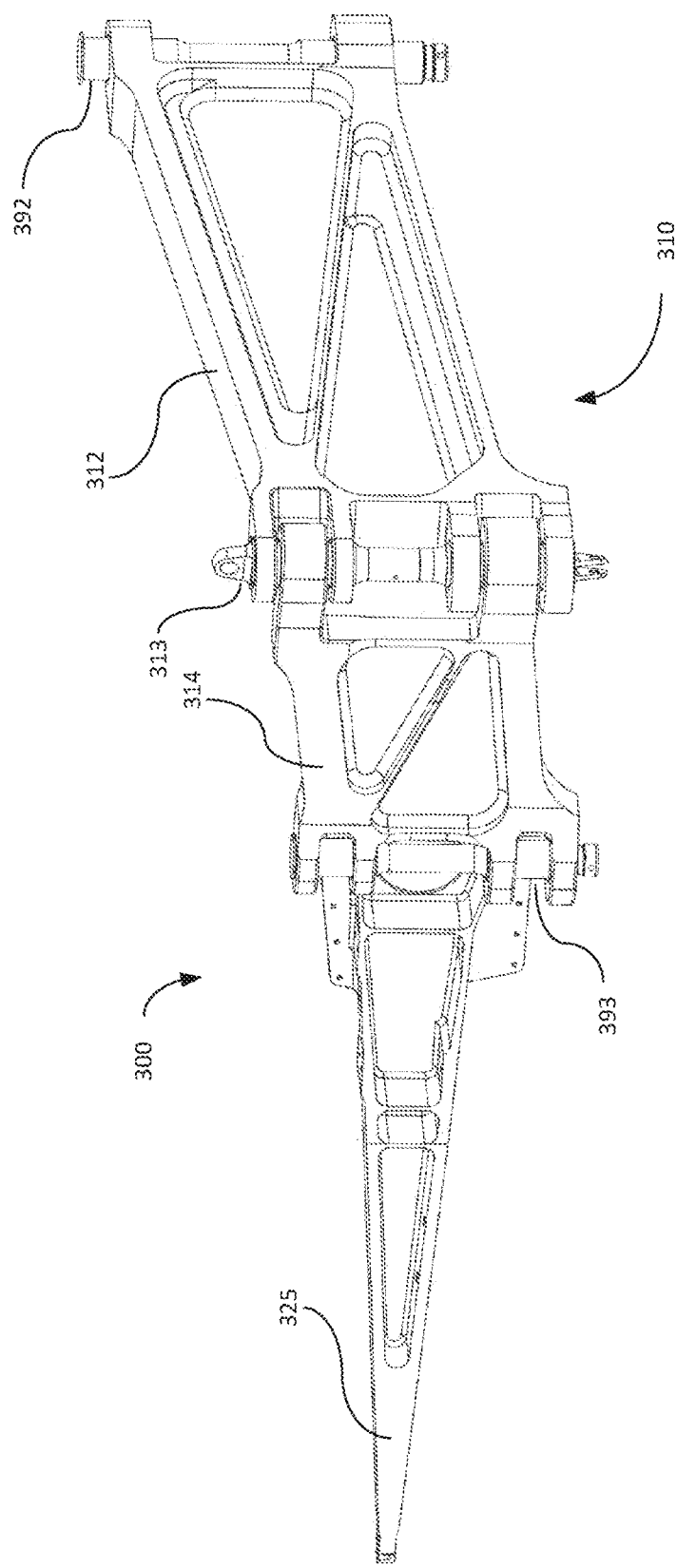
FIG. 11 is a front-perspective view of a mechanism for swinging a wing, according to an embodiment.

FIGS. 11-14 depict various views of a mechanism 300 for moving a wing from a deployed configuration to a retracted configuration. FIG. 11 is a front-perspective view of the mechanism 300, and FIGS. 12A-E are a top-left-perspective, front-planar, left-planar, top-planar, and rear-planar view, respectively, of the mechanism 300. The mechanism 300 includes a hinged beam 310 and a hinge arm 325. A pin 313 pivotably couples a first portion 312 of the hinge beam 310 to a second portion 314. As shown, in some embodiments, the second portion 314 of the hinge beam 310 can be constructed similar to an I-beam truss. The first portion 312 of the hinge beam can be constructed, in some embodiments, similar to an I-beam with lightening holes in the vertical web. The mechanism 300 can be structurally and/or functionally similar to the mechanisms described above with reference to FIGS. 1-10.

Referring especially to FIG. 12D, the second portion 312 of the hinged beam 310 may not be directly coupled to the hinge arm 325. Rather, the hinge beam 310 may be coupled to the hinge arm 325 via the wing. For example, the hinge arm 325 can be fixedly coupled to the wing 380 as shown, for example, in FIG. 14. The second portion 314 of the hinge beam 310 can in turn be coupled to the wing 380.

As described in the background section, some known aircraft employ a large hinge (e.g., a titanium hub) to allow their wings to swing. Such hinges are disposed on a load path of wing, necessitating a robust and heavy design. The hinge arm 325 effectively moves the hinge point aftward and outboard to the location of pin 394 where the mechanism 300 is rotatably coupled to the vehicles frame, increasing the available range of motion of the wing, allowing the wing to swing through 90 or more degrees. Beam 310 reinforces the hinge arm 325 obviating the need for a heavy and expensive hinge.

Referring especially to FIGS. 11 and 12E, the second portion 314 of the hinge beam 310 is offset vertically downwards from first portion 312. In other embodiments, the second portion 314 of the hinge beam 310 can be vertically offset upwards from the first portion 312. Such a vertical offset, either upwards or downwards, can change the height at which the wing attaches to the hinge beam 310. In this way, clearance between the second portion 314 of the hinge beam 310 and the floor pan of the vehicle can be created and/or increased. Additionally, such an arrangement can enable the first portion 312 of the hinge beam 310 to be relatively taller. In some instances, the inboard portion of the beam 310 (e.g., near pin 392) may bear relatively greater stresses than the outboard portion of the beam 310 (e.g., near pin 393). Thus, a taller first portion 312 and shorter second portion 314 of the beam 310 can provide structural and weight-saving advantages.

In combination with the vertical offset and/or separately, tilting the axis of pin 392 can cause the hinge beam 310 and/or the wing to rotate through a non-planar arc. The wing can rotate about the longitudinal and/or span-wise axes while moving between the retracted and deployed configurations. Referring especially to FIGS. 12C and 12E, pin 392 (and, optionally, pins 313 and/or 393) can be canted from vertical Z in longitudinal direction L, forming an angle $\alpha$ and/or a transverse direction T forming an angle $\beta$. As shown in FIG. 12C, pin 392 can be canted in an aft direction towards the longitudinal axis L, such that pin 392 forms an angle $\alpha$ of 8 degrees with respect to the vertical axis Z. In other embodiments $\alpha$ can be any suitable angle, such as between −15 and 15 degrees. As shown in FIG. 12E, pin 392 can be canted in an outboard direction towards the transverse axis T, such that pin 392 forms an angle $\alpha$ of 6 degrees with respect to the vertical axis Z. In other embodiments, $\beta$ can be any suitable angle, such as between −10 degrees and 10 degrees. In some embodiments pins 313 and/or 393 can also be tilted such that they are parallel to pin 392. In other embodiments, a higher order joint (e.g., a ball-type joint) can be used, for example in place of pin 313 and/or 394.

Tilting pin 392 towards the longitudinal axis L can cause the wing to rotate about its longitudinal axis when moving between the retracted and deployed configurations. In this way, the dihedral of the wing in the deployed configuration and flatness of the wing in the retracted configuration can be tuned. For example, the wing can be coupled to the mechanism 300 such that it is substantially flat in the retracted configuration and the angle α can be selected to obtain the desired dihedral when the wing is in the deployed configuration. Similarly, tilting pin 392 towards the transverse axis T can cause the wing to rotate about its span-wise axis when moving between the retracted and deployed configurations. Thus, a wing can be coupled to the mechanism 300 such that it is substantially flat in the retracted configuration and the angle β can be selected to obtain the desired angle of incidence when the wing is in the deployed configuration. Similarly stated, a root chord angle of the wing can be greater with respect to the horizontal when the wing is in the deployed configuration than when the wing is in the retracted configuration (or vice versa). In this way, the wing can be substantially flat, minimizing storage space, when the wing is in the retracted configuration while providing a positive angle of incidence and/or dihedral to improve lift and/or aerodynamic stability when the wing is deployed.

Figure 13:
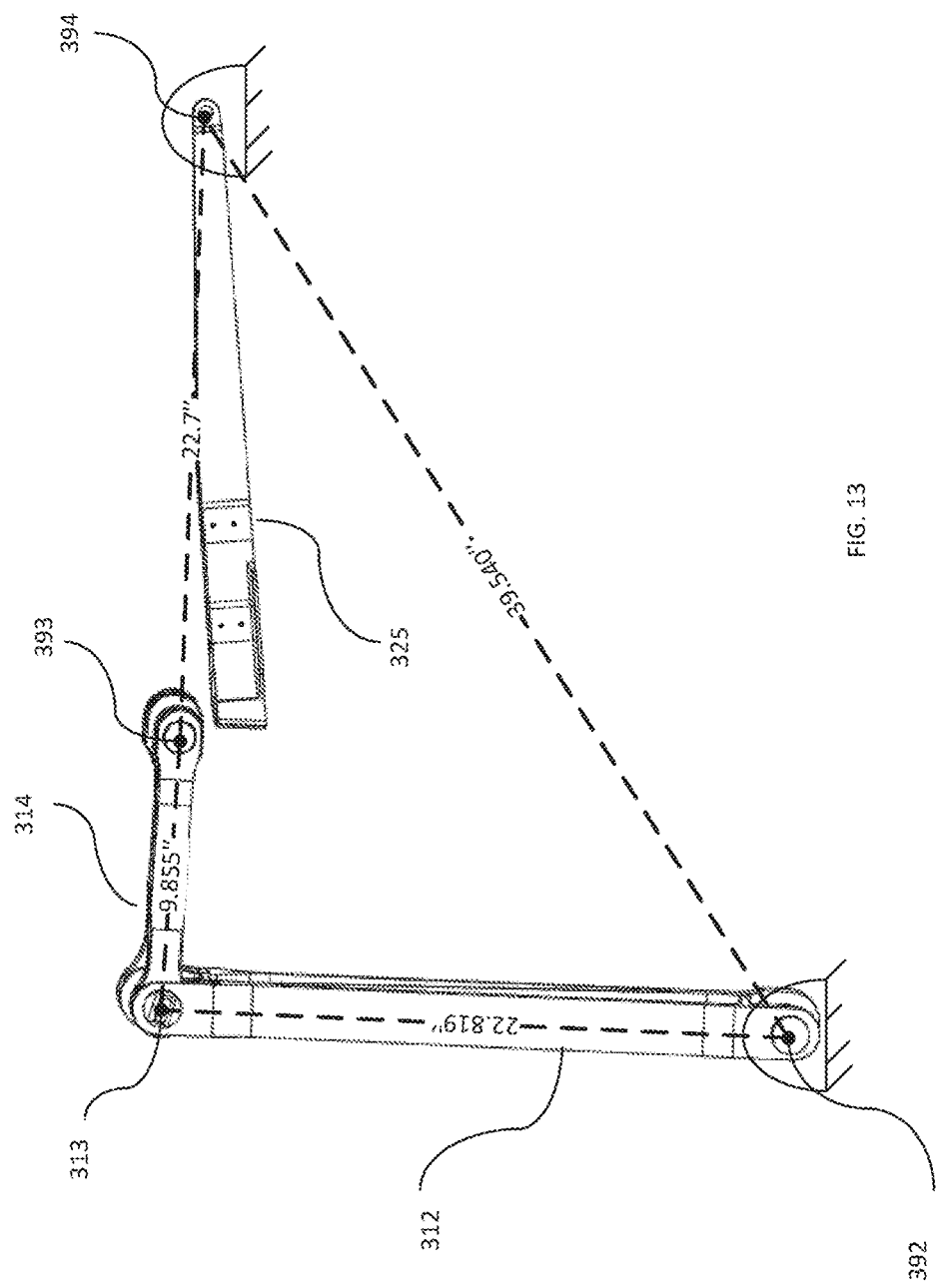
FIG. 13 is top planar view of the mechanism of FIG. 11 showing horizontal plane dimensions.
Figure 14:
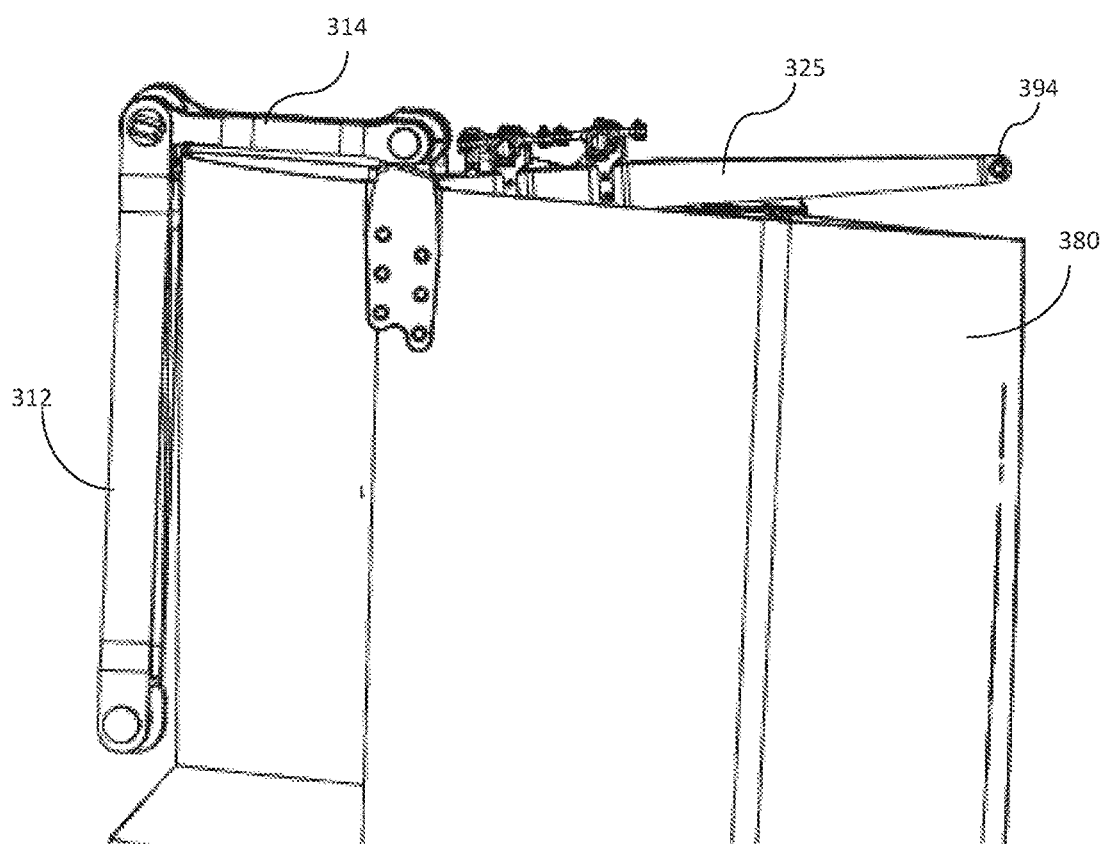
FIG. 14 is an aircraft wing showing a hinge beam and hinge arm, according to an embodiment.

FIG. 13 provides dimensions of the mechanism 300, in a horizontal plane, according to an embodiment. A horizontal distance from pin 392, coupling the hinged beam 310 to the vehicle frame, to pin 313, coupling the first portion 312 of the hinged beam 310 to the second portion 314 of the hinged beam 310, is 22.819 inches. A horizontal distance from pin 313 to pin 393, coupling the hinged beam 310 to the wing, is 9.855 inches. A horizontal distance from pin 393 to pin 394, coupling the hinge arm 325 to the wing, is 22.7 inches. A horizontal distance from pin 394 to pin 392 (e.g., a horizontal distance from a forward attachment point 394 to a vehicle frame and an aft attachment point 394 to a vehicle frame) is 39.540 inches. In other embodiments, a length of the first portion 312 of the beam 310 can be between 2 and 2.5 times a length of the second portion 314 of the beam 310, a distance between a location 394 where the hinge arm 325 is rotatably coupled to the frame and a location 393 where the second portion 314 of the beam 310 is rotatably coupled to the wing can be between 2 and 2.5 times the length of the second portion 314 of the beam 310, and a distance between the location 394 where the hinge arm 325 is rotatably coupled to the frame and a location 392 where the first portion 312 of the beam 310 is rotatably coupled to the frame can be between 3.75 and 4.25 times the length of the second portion 314 of the beam 310.

Said slightly differently, in some embodiments, a horizontal distance from pin 313 to pin 393 coupling the hinged beam 310 to the wing can be substantially equal to a distance from pin 393 to a leading edge of the wing (not shown in FIG. 13) plus the width of the hinged beam 310 (e.g., the average width or the maximum width). Such a length of the second portion 314 of the beam 310 can provide clearance for the first portion 312 of the beam 310 to fold up substantially parallel to the leading edge of the wing and still clear the wing during movement between the retracted and deployed configurations. In some embodiments, the leading edge of the wing can include a flexible cuff such that the leading edge of the wing can contact and deflect upon contact with the first portion 312 of the beam 310 when the wing moves between the deployed configuration and the retracted configuration. In some embodiments, the first portion 312 of the beam 310 has a smaller width than the second portion 314 of the beam 310, which can provide some or additional clearance for the wing as the wing moves from the retracted to the deployed configurations.

Figure 15:
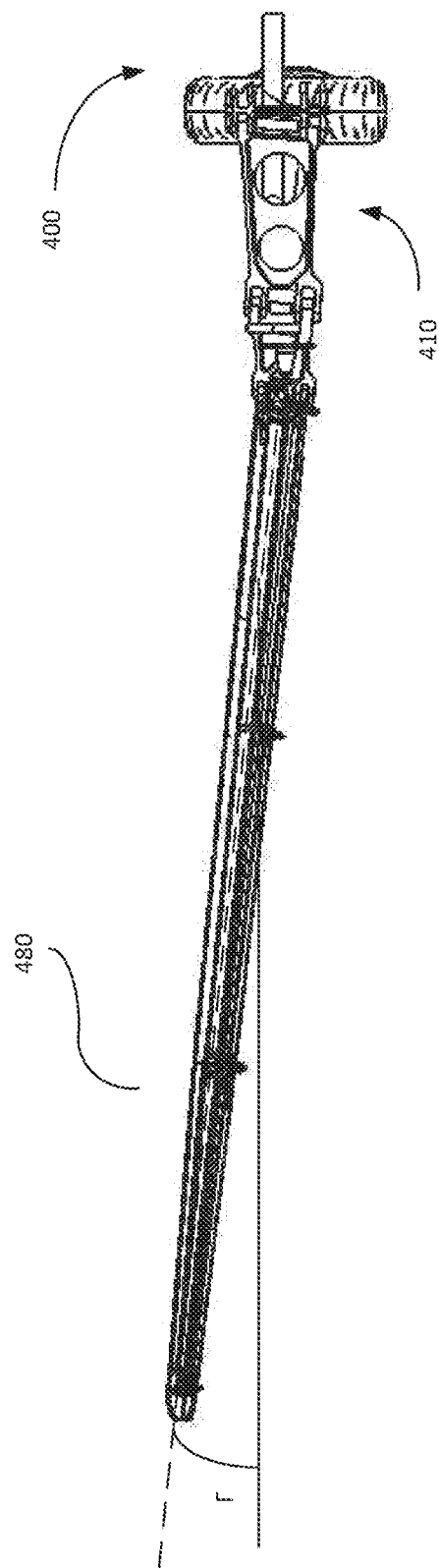
FIG. 15 is a rear view of an aircraft wing in a deployed configuration, according to an embodiment

FIG. 15 depicts a wing 480 coupled to a frame of a vehicle 400 via a mechanism 410. Mechanism 410 can be functionally and structurally similar to mechanism 300 as shown and described above with reference to FIGS. 11-13. Wing 480 has a positive dihedral Γ of 6 degrees in a deployed condition. In other embodiments, the wing 480 can have any suitable dihedral Γ, such as between −5 and 15 degrees. As discussed above with reference to FIGS. 12C and 12E, the dihedral Γ can be a function of an angle of a pin joining the mechanism 410 to the frame of the vehicle 400. Wing 480 can be swung forward into a retracted configuration in which it is substantially horizontal. As shown in FIG. 15, wing 480 has an angle of incidence of zero degrees. It should be understood, however, that in other embodiments, wing 480 may have a non-zero angle of incidence.

Returning to FIGS. 11-14, the length of the beam 310 is correlated to wing sweep. By keeping the location of pins 392 and 394 (i.e., the location at which the mechanism 300 is attached to the frame of the vehicle) and decreasing the length of the first portion 312 of the beam 310, the sweep of the wing can be increased (e.g., the wing can have a rearward sweep in the deployed configuration). Conversely, by increasing the length of the first portion 312 of the beam 310, the sweep of the wing can be decreased. In some embodiments, altering the length of the first portion 312 of the beam 310 without varying the length of the second portion 314 of the beam can alter the wing sweep without substantially altering the kinematics of the mechanism 300.

Figure 16:
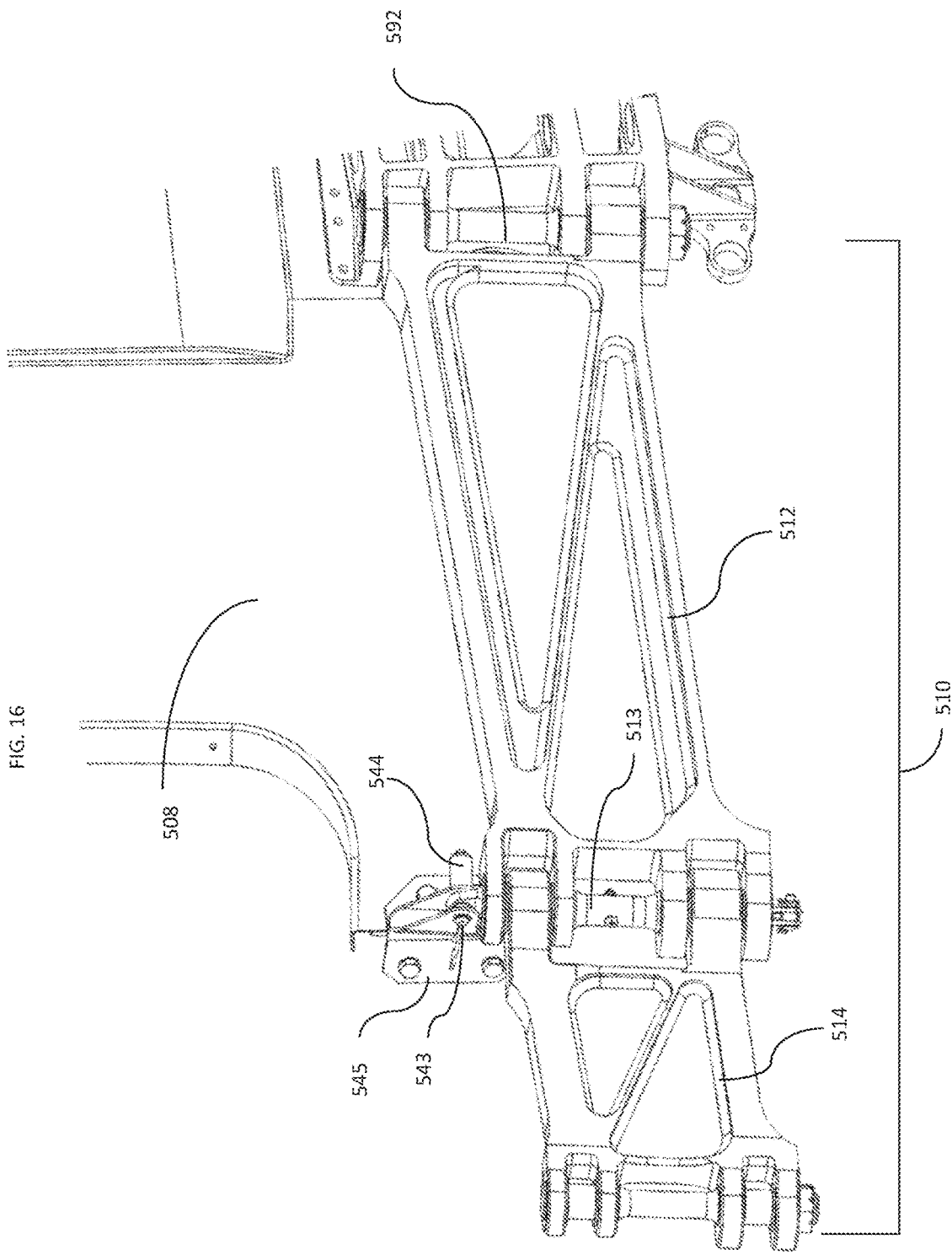
FIG. 16 is a detail view of a mechanism for swinging an aircraft wing, according to an embodiment.

FIG. 16 is a detail view of a mechanism for swinging an aircraft wing, according to an embodiment. FIG. 16 depicts a hinged beam 510, having a first portion 512 rotatably coupled to a second portion 514 via a hinge pin 513. The hinged beam 510 can be structurally and/or functionally similar to the hinged beams described above. The hinged beam 510 is in a configuration associated with a deployed wing. When the hinged beam 510 is extended, a solenoid 544 can insert a solenoid pin 543 though the hinge pin 513 and a shear panel bracket 545 coupling the hinged beam 510 to a shear panel 508, a structural member of the vehicle body, restraining the hinge beam 510 from moving. In this way, the solenoid 544 can lock the wing in the deployed configuration. In addition, the solenoid pin 543 can be configured to transfer loads and moments associated with flight to the shear panel 508.

Figure 17:
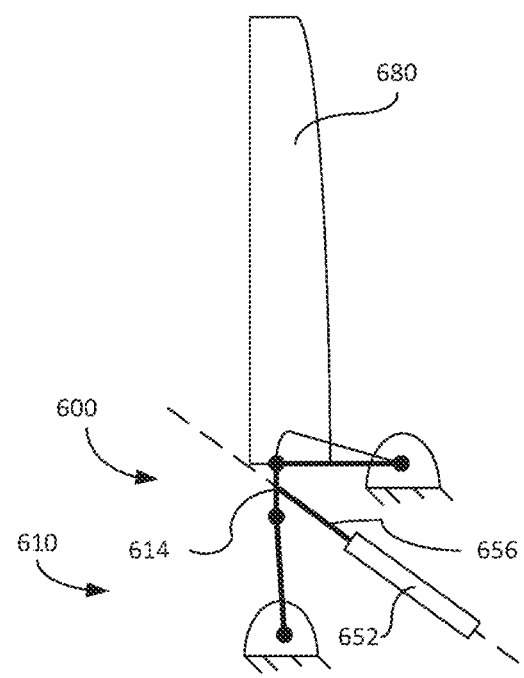
FIG. 17 is a schematic diagram of a mechanism for swinging an aircraft wing, including a drive mechanism, according to an embodiment.

FIG. 17 is a schematic diagram of an aircraft wing 680 in a deployed configuration and a mechanism 600 for swinging the wing 680, according to an embodiment. FIG. 17 is structurally and functionally similar to FIG. 1A. FIG. 17 is also structurally and functionally similar to FIGS. 2-4, except FIG. 17 depicts an alternate actuation assembly for moving the wing 680 between the deployed and retracted configurations.

FIG. 17 depicts a linear actuator 652 and a drive link 656 coupling the linear actuator 652 to a second portion 614 of a hinge beam 610. The linear actuator 652 and the drive link 656 are configured to exert a force vector having an angle of approximately 49 degrees (e.g., 46-52 degrees) with respect to a transverse axis of the vehicle at a location that is ⅓ of the length of the second portion 614 of the hinge beam 610 inboard from the point at which the hinge beam 610 is pivotally coupled to the wing 680. The applicant has discovered that varying the location at which the force vector is applied, or the angle at which the force vector is applied, by more than approximately 10% results in a significant increase (e.g., doubling) in force required to move the wing 680. In some embodiments (e.g., embodiments having dimensions similar to those shown and described with reference to FIG. 13), a total length of travel of the linear actuator 652 can be approximately 16.125 inches. The drive link 652 can be rotatably coupled to the linear actuator 652 and/or the second portion 614 of the hinge beam 610, such that, as the linear actuator 652 moves along a straight line, the second portion 614 of the hinge beam 610 can follow a slight 'S' curve path as the wing 680 moves between the deployed and retracted configurations.

While various embodiments of the system, methods and devices have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and such modifications are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

For example, although various embodiments have been described as having particular features and/or combinations of components, other embodiments are possible having any combination or sub-combination of any features and/or components from any of the embodiments described herein. In addition, the specific configurations of the various components can also be varied. For example, the size and specific shape of the various components can be different than the embodiments shown, while still providing the functions as described herein.

What is claimed is:

1. An apparatus, comprising:
   a body;
   a wing coupled to the body, wherein the wing is configured to pivot forward from a deployed configuration, in which the wing extends from the body, to a retracted configuration; and
   a beam configured to transmit loads associated with flight from the wing to the body, a first portion of the beam pivotably coupled to a second portion of the beam.

2. The apparatus of claim 1, wherein the body comprises a frame, and at least a portion of the beam is configured to transmit substantially all loads and moments associated with weight and lift from the wing to the frame.

3. The apparatus of claim 1, further comprising a pin configured to fix the wing in the deployed configuration, wherein the pin is configured to resist rotation of the wing in a forward direction and transmit loads and moments from the wing to the body.

4. The apparatus of claim 1, wherein the body comprises a frame, the first portion of the beam is rotatably coupled to the frame, and the second portion of the beam is rotatably coupled to the wing.

5. The apparatus of claim 4, further comprising:
   a hinge arm rotatably coupled to the wing and the frame.

6. The apparatus of claim 1, wherein the first portion of the beam and the second portion of the beam form an angle of between 160 degrees and 200 degrees in the deployed configuration.

7. The apparatus of claim 1, wherein the first portion of the beam and the second portion of the beam are substantially coaxial in the deployed configuration.

8. The apparatus of claim 1, wherein the wing has a positive dihedral in the deployed configuration and is substantially horizontal in the retracted configuration.

9. The apparatus of claim 1, wherein a chord line of the wing defines a greater angle with respect to a horizontal plane in the deployed configuration than in the retracted configuration.

10. The apparatus of claim 1, wherein the body comprises a frame, the first portion of the beam is rotatably coupled to the frame, and the second portion of the beam is fixedly coupled to the wing.

11. An apparatus, comprising;
    a body having a frame;
    a wing coupled to the body, wherein the wing is configured to pivot forward from a deployed configuration, in which the wing extends away from the body, to a retracted configuration; and
    a linkage coupling the wing to the body, wherein the linkage comprises:
      a hinge arm, wherein the hinge arm is fixedly coupled to the wing and rotatably coupled to the frame; and
      a beam, wherein the beam has a first portion and a second portion, the first portion of the beam is rotatably coupled to the frame and the second portion of the beam, and the second portion of the beam is rotatably coupled to the first portion of the beam and the wing.

12. The apparatus of claim 11, wherein the hinge arm is indirectly coupled to the second portion of the beam.

13. The apparatus of claim 11, wherein:
    the wing includes a root end surface and a leading edge;
    the first portion of the beam is substantially parallel to a leading edge of the wing in the retracted configuration; and
    the second portion of the beam is substantially parallel to the root surface in the retracted configuration.

14. The apparatus of claim 11, wherein:
    the first portion of the beam and the second portion of the beam are each substantially parallel to a leading edge of the wing in the deployed configuration.

15. The apparatus of claim 11, wherein:
    a leading edge of the wing has a notch, and a portion of the first portion of the beam is within the notch in the retracted configuration.

16. The apparatus of claim 11, wherein:
    a length of the first portion of the beam is between 2 and 2.5 times a length of the second portion of the beam;
    a distance between a location where the hinge arm is rotatably coupled to the frame and a location where the second portion of the beam is rotatably coupled to the wing is between 2 and 2.5 times the length of the second portion of the beam; and
    a distance between the location where the hinge arm is rotatably coupled to the frame and a location where the first portion of the beam is rotatably coupled to the frame is between 3.75 and 4.25 times the length of the second portion of the beam.

17. The apparatus of claim 11, wherein the hinge arm is offset vertically from the first portion of the beam.

18. The apparatus of claim 11, further comprising:
    a drive link rotatably coupled to the second portion of the beam, wherein the drive link is configured to apply a force to the second portion of the beam to cause the wing to move between the deployed configuration and the retracted configuration.

19. The apparatus claim 11, further comprising:
a drive link coupled to a linear actuator and the second portion of the beam, wherein the drive link is configured to apply a force to the second portion of the beam to cause the wing to move between the deployed configuration and the retracted configuration, and the linear actuator defines an angle of between 46 degrees and 52 degrees with respect to a centerline of the body.

20. The apparatus of claim 11, further comprising a pin coupling the first portion of the beam to the frame, wherein the pin is canted from vertical such that the wing has a positive dihedral in the deployed configuration and a substantially zero dihedral in the retracted configuration.

* * * * *